United States Patent Office 3,382,165
Patented May 7, 1968

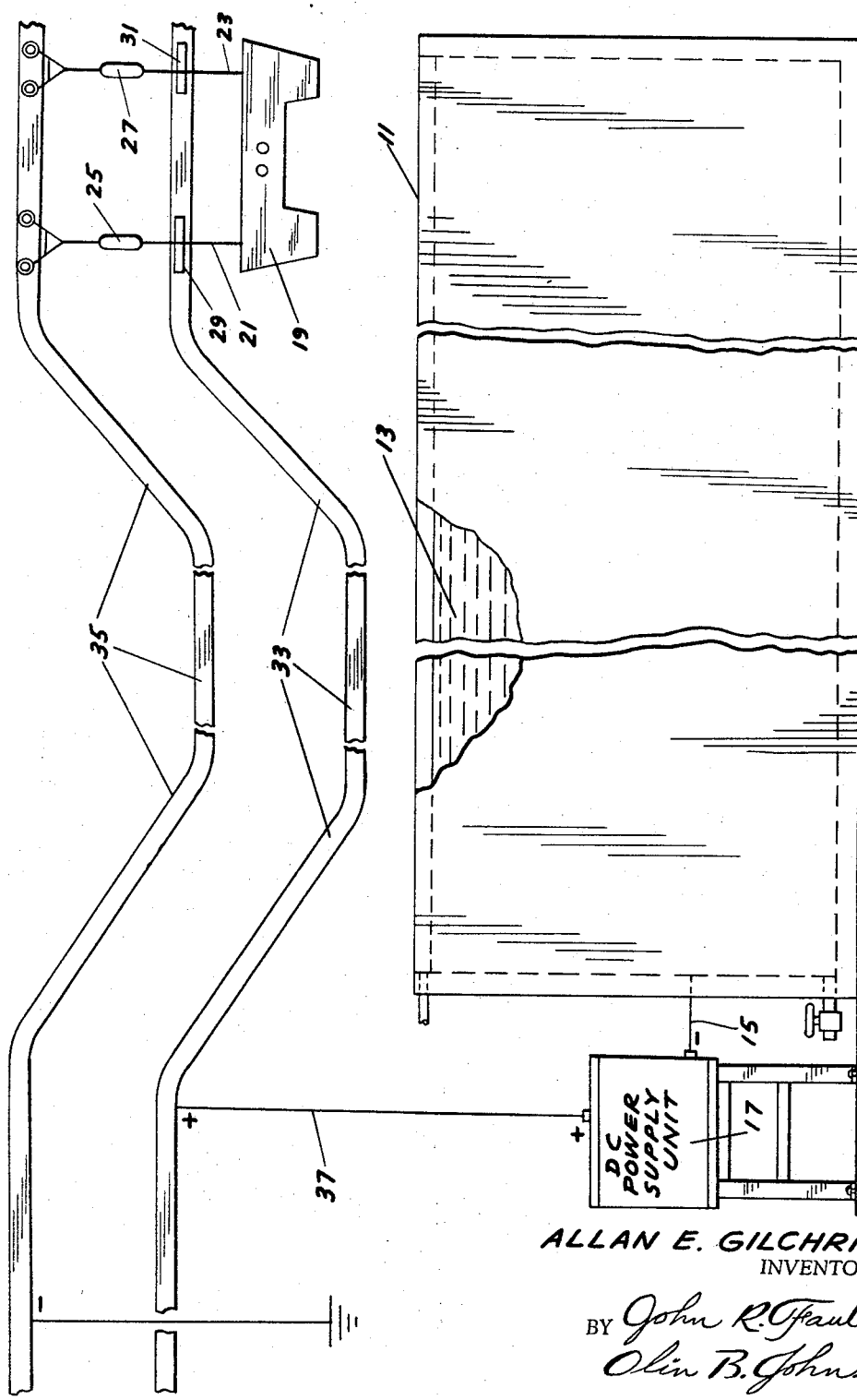

3,382,165
ELECTRODEPOSITION WITH ORGANIC ACID RESINS HAVING MINERAL ACID GROUPS ATTACHED THERETO
Allan E. Gilchrist, Fairview Park, Ohio, assignor to Ford Motor Company, Dearborn, Mich., a corporation of Delaware
Continuation-in-part of application Ser. No. 258,913, Feb. 15, 1963. This application June 28, 1965, Ser. No. 467,390
48 Claims. (Cl. 204—181)

This application is a continuation-in-part of application Ser. No. 258,913, filed Feb. 15, 1963, now abandoned, which in turn was a continuation-in-part of my then copending patent applications Ser. Nos. 132,303, filed Aug. 18, 1961, now abandoned; 183,024, filed Mar. 28, 1962, now abandoned; 186,320, filed Apr. 10, 1962; 186,496, filed Apr. 10, 1962, now abandoned; 202,691, filed June 15, 1962, now abandoned; 218,575, filed Aug. 28, 1962, now abandoned; 186,320, filed Apr. 10, 1962; now abandoned. The disclosures of these copending applications are incorporated herein by reference.

This invention relates to anodic deposition of an acid resin upon an electrically conductive object immersed within an aqueous bath. In particular, this invention relates to electrically induced conversion of ionized acidic resin particles within an aqueous bath into a uniform coating upon a workpiece-anode and to novel resins for use in this process. More particularly, this invention relates to electropainting with acid resins having in their molecular structure mineral acid groups selected from oxygenated sulfur-containing groups and oxygenated phosphorous-containing groups which dissociate in the aqueous electrocoating bath, i.e. sulfonic, phosphonic, sulfate and phosphate groups. In a preferred embodiment, the dispersible resin unit has a plurality of acidic groups which dissociate in the operational bath, the major proportion of which are carboxylic acid groups and a minor proportion of which are of the aforesaid mineral acid groups. It is within the scope of this invention to employ one of such resins as the sole anionic polyelectrolyte in the coating bath, in combination with another species of this class of resins, or in combination with a polycarboxylic acid resin in which the only dissociable acid groups are carboxylic acid groups.

The resins employed as anionic polyelectrolytes in the process of this invention are further characterized in that they will deposit at constant voltage essentially directly proportional to the direct current passed through the bath between the anode and cathode of the electrodeposition cell until the current of deposition initiation is essentially dissipated, i.e. until such current is not substantially more than about 5%, and preferably not substantially above about 1% of the current of initiation.

In the process of this invention electrodeposition of the resin is meant to include the electrically induced deposition of the acid resin or acid resins, alone or in a physical mixture for codeposition with finely divided solids, i.e. pigments and/or film-bodying materials, tints, plasticizers, and the like; dispersions of essentially inert resin extenders, i.e. resins not significantly acidically-reacting and thus not significantly ionizable in water, such as amide resins, polyfluoroethylene resins, hydrocarbon resins and latices, e.g. butadiene-styrene latices, cumarone-indene resins, polyethylene resins, vinyl resins such as vinyl chloride or vinyl acetate, epoxide resins; and dispersions of polycarboxylic acid resins such as are disclosed in the previously referred to copending patent applications, and materials reactive with the oxygenated sulfur and phosphorous acids upon or after their deposition on the anode. For best film formation the preferred particulate size of the dispersed resin particles of any sort in the bath is below 500 millimicrons. The anionic polyelectrolyte behavior of the instant acid resins imparts evenness to the resulting resin deposit. Hence, where such evenness is desired especially, proportions of inert resin extenders for codeposition from the bath should be limited to those which do not mask these unique electrical migration characteristics and give rise to manifestly heavier deposition at edges and corners of the anode to be coated.

Advantages of this invention over prior related practices include simplicity of operation and versatility of codeposition with various other resin systems which are less easily ionized, if ionized at all, in aqueous baths.

Broadly, the process comprises the utilization of an electrical circuit including an aqueous bath in which the instant acid resins are dispersed as a plurality of finely divided anionic electrolytes, an anode-workpiece immersed in said bath and a cathode spaced apart from said anode and in electrical communication with said bath; establishing and maintaining the bath at a temperature between about 15° C. and about 90° C.; passing direct current through said circuit to a potential in the range of about 20 to about 500 volts, thereby depositing said resin on said anode as a resinous phase distinct from said bath; and setting said resin deposit on said anode.

To obtain maximum advantage of the combined employment of carboxylic acid groups and the aforementioned mineral acid groups, the mineral acid groups preferably comprise about 0.5 to about 10% of the total number of dissociable acid groups in the resins to be employed in the bath whether the acid resin component of the dispersion is made up of a single acid resin having both types of acid groups within its molecular structure, or of more than one acid resin and at least one resin thereof contains such mineral acid groups.

Dispersion of the instant acid resins for my purposes includes formation of finely divided anionic polyelectrolytes in water suspensions or solution. The maximum acid resin polyelectrolyte particle size should not be above about 50 microns with a preference for much smaller particles for resin film formation at deposition temperature, so that the resinous polyelectrolytes can be suspended readily, with agitation if necessary, at moderate bath viscosities which should not be substantially greater than 200 times that of water and preferably are only slightly greater than water. The acid resin may comprise about 0.5 to about 35 wt. percent of the bath and preferably a concentration in the range of about 2 to about 10 wt. percent is used for efficiency and economy. This enables resin penetration into interstices of the anode to be coated and eliminates excessive "drag" of the bath dispersion as an anode is withdrawn from the operating bath.

In the water-dispersed polyelectrolyte state acid groups of the instant resins are ionized to render the resin particles anionic. For instance, in the preferred resin there are attached to the carbon structure backbone of the resin a plurality of acid groups including a majority of carboxyl groups and a minor amount of oxygenated acidic sulfur or oxygenated acidic phosphorous radicals dissociated from their hydrogen ions.

Useful resins for use in the process include aromatic and aliphatic sulfonic resins, sulfonated aromatic and aliphatic resins, aromatic and aliphatic phosponic resins, phosphonated aromatic and aliphatic resins including but not by way of limitation the resins hereinafter exemplified. Sulfinic and phosphinic acid resins can be used but are less desirable because of their cost. In any event, the tendency of the sulfinic and phosphinic acid groups to convert in the presence of oxygen to sulfonic and phosphonic acid groups would bring such resins in operation within the scope of this invention through such conversion.

These resins most generally are made by reacting preformed polymers with the appropriate mineral acid, acid anhydride, or other acid yielding compounds; however, they can be made also by copolymerizing unsaturated monomers having the desired acid function, e.g. sodium styrene sulfonate, with monomers containing conjugated carbon-to-carbon double bond to yield copolymers on which the desired acidic oxygenated sulfur or phosphorous groups are present.

The molecular weights of the resins used vary appreciably with the type of backbone resin to which the aforementioned acid groups are attached. For example, with the coupled glyceride drying oil resins, e.g. the reaction product of linseed oil and maleic anhydride further reacted with a vinyl monomer, preferably have a molecular weight in the range of about 5,000 to about 20,000 whereas with acrylic type resins the molecular weight may range upward from about 50,000. To obtain ease of water dispersibility or water solution in practical bath concentrations of about 1% or more, the molecular weight is advisedly not substantially in excess of about 500,000.

Because of the relatively high degree of ionization of mineral acid groups in these polyelectrolytes, it is with some embodiments not necessary to add to the bath any dispersing assistant to further ionize them. However, the use of amino compounds, which term is used herein to include both amines and ammonia, can be advantageous and with many such resins necessary. In other embodiments one may find use for caustic soda and other water soluble alkalies. Water soluble and/or water dissociable amines are preferred for this purpose. These may include monoamines, polyamines, alkanol amines, etc., and are added to the bath to assist in dispersing the resin and to obtain a bath pH low enough to prevent substantial amounts of $CO_2$ from being absorbed from air during operation and high enough to prevent undesirable corrosion of the bath retainer, etc. Ordinarily, the bath pH will be in the range of about 6.8 to about 9 but in certain embodiments a pH moderately outside this range may be used advantageously. Routine testing will determine the most advantageous pH for deposit of the given resin giving due consideration to bath stability, continuous or intermittently continuous bath replacement, the intended exposure of the coating after baking, etc. In the deposition operation this is particularly valuable since the ions of alkali migrate toward the cathode zone or zones and the acid resin is attracted to the anode or anodes. Thus, the cathode, which may be the bath tank, can be given additional protection against corrosion while the coating process is carried on and simultaneously the acid resin at the anode is permitted a strong etching bite for improved adhesion.

In most instances the bath temperature can be between about 10° C. and about 50° C. to restrict evolution of undesired volatile substances. However, temperatures up to about 90° C., or just below the boiling point of the aqueous bath, can also be used, particularly when such a warm temperature at the anode is used to assist in obtaining a desired reaction in the deposited film.

The process may be carried out at a constant voltage in the range of about 20 to about 500 volts or the voltage may be started at a lower voltage and increased during deposition to a predetermined maximum within such range. Functionally, the potential should be high enough to effect substantial deposition upon the workpiece in a practical time limit, e.g. 0.5 to 3.0 minutes, and sufficiently low to avoid electrical breakdown evidenced by cracks or spots which may be termed pinholes, cracks, crazes, fisheyes, etc. For certain specialized embodiments, it is within the scope of this invention to employ a coating time as low as a few seconds and as high as 10 minutes or more. The upper potential at which electrical breakdown occurs varies appreciably with the given resin employed and some routine testing is necessitated to determine the most advantageous potential for a given resin. When properly operated, the resin with or without extenders, pigments, etc., deposits on the anode as a distinct phase from its dispersion in the bath. In effect some resin consolidates on the anode so that, even though the resin happens to be fairly water soluble, the anode can be removed from the bath with a resinous deposit thereon which resists redispersion in the bath. This consolidation can come from concentration of the resin on the anode and resulting viscosity increase of the resin deposit over that of the bath, dehydration of the resin deposit, additional polymerization of the resin, and/or its coalescence.

The setting of the resin deposit on the anode is to render it water resistant. This can be done in a number of ways. Thus, for example, if the resin is ethylenically unsaturated, it can be crosslinked with itself or with extraneous added materials such as divinyl benzene by warming and free radical catalysis to become a highly water resistant material; alternatively the acid groups can be reacted by condensation, e.g. with polyols such as glycols, polyamines, or epoxy compounds such as dipentene dioxide or 1,4-epoxy - 6 - methylcyclohexylmethyl - 1,4-epoxy-6-methylcyclohexanecarboxylate. Optionally, some epoxy compounds, polyols, etc., can be transferred with the resin onto the anode and reacted in place to obtain the desired setting during the electro-coating operation or subsequently. Where the acid resin is codeposited with an inert extender such as a latex, simple coalescence and air curing of the latex-containing film can be adequate setting for many purposes.

Another way of setting is to react the acid groups with a metal compound such as aluminum or metal compounds of Group II–B–VIII metals, suitably by dipping or spraying with water solutions thereof, whereby water-resistant metals replace the hydrogen of the acid groups. Aluminum and heavy metal compounds are the best for this treatment.

For ease of dispersion and electrical "throw" into interstices the acid resins should have an electrical equivalent weight broadly between about 500 and 20,000, and preferably between about 1,000 and 2,500. The electrical equivalent weight of a given resin or resin mixture is herein defined as that amount of resin or resin mixture that will deposit per Faraday of electrical energy input under the conditions of operation set forth in detail in the succeeding paragraph. For this purpose the value of one Faraday in coulombs is herein taken to be 107.88 (atomic weight of silver) ÷0.001118 (gram of silver deposited by one coulomb from silver nitrate solution) or 96,493. Thus, if 0.015 gram of coating, the binder acid resin moiety of which is 90% by weight and the balance of which is amino compound used to disperse it in the bath is transferred and coated on the anode per coulomb input to the process, the electrical equivalent weight of the resin is about 1303 or 0.015×0.9×107.88÷0.001118.

By way of further illustration I find electrical equivalent weight (in the nature of a gram equivalent weight in accordance with Faraday's laws) of a particular acid resin or resin mixture simply and conveniently for typical process conditions standardized on as follows: an acid resin concentrate is made up at 65.56° C. (150° F.) by thoroughly mixing 50 grams of the acid resin, 8 grams of distilled water and diisopropanol amine in an amount sufficient to yield resin dispersion pH of 7.8 or slightly lower after the concentrate has been reduced to 5% by weight resin concentration with additional distilled water. The concentrate is then diluted to one liter with additional distilled water to give 5% resin concentration in the resulting dispersion. (If a slight insufficiency of the amine has been used, and the dispersion pH is below 7.8, pH is brought up to 7.8 with additional diisopropanol amine.)

The dispersion is poured into a metal tank, the broadest side walls of which are substantially parallel with and 2.54 cm. out from the faces of a thin metal panel anode. The tank is wired as a direct current cathode, and the direct current anode is a 20 gauge, 10.17 cm. (4 inches) wide, tared steel panel immersed in the bath 7.62 cm. (3.5 inches) deep. At 26.67° C. (80° F.) bath temperature direct current is impressed from anode to cathode at 100 volts for 1 minute from an external power source, the current measured by use of a coulometer, and the current turned off. The anode panel is removed immediately, rinsed with distilled water, baked for 20 minutes at 176.67° C. (350° F.) and weighed. All volatile material such as water and amine is presumed to be removed from the film for practical purposes by the baking operation. The difference between tared weight of the fresh panel and final weight of the baked panel divided by the coulombs of current used, times 107.88, divided by 0.001118 gives the electrical equivalent weight of the resin for purposes of this invention.

The following examples show ways in which my invention can be practiced, but should not be construed as limiting the invention. All parts are parts by weight and all percentages are weight percentages unless otherwise expressly indicated.

In the exemplary baths described hereafter, the acid resins show anionic polyelectrolyte behavior; deposition of the acid resin on the anode is essentially directly proportional to the direct current passing through the bath. The resin deposit operation is conducted in a copper tank. The tank is wired as a cathode holding the bath of resin dispersion. The anode is a thin sheet steel panel immersed in the bath from the top so that the panel is in electrical contact with the bath. The panel top protrudes in air and is held by an electrical clamp contact. After immersing the anode, direct current is imposed from an external circuit across the bath from the tank cathode to the immersed panel anode. Current is controlled at about 20–40 amperes per square meter of the immersed panel surface, and the voltage across the bath is raised gradually to the indicated maximum during a run. Operating temperature of the bath is room temperature, about 20° C., and the operating times are from 1–3 minutes.

Apparatus which heretofore has proven suitable for electrodeposition of polycarboxylic acid resins in a continuous coating operation, one embodiment of which is illustrated in the accompanying schematic drawing, may likewise be used for carrying out the process of this invention.

In the drawing a steel tank 11 contains a coating bath 13 and serves as a negative electrode in the coating process. Tank 11 is electrically connected to D.C. power supply unit 17 via conductor 15. An article to be coated 19, e.g. an automotive body, is shown suspended from a conveyor 35 by hangers 21 and 23. Conveyor 35 is a conventional electrically powered, chain driven conveyor constructed and arranged for the transportation of articles to be coated through bath 13. Hangers 21 and 23 include insulators 25 and 27, respectively, which insulate article 19 from the grounded conveyor. Contact plates or brushes 29 and 31 are attached to and in electrical connection with hangers 21 and 23, respectively. Article 19 is shown approaching bath 13 and in electrical connection with bus bar 33 which in turn is in electrical connection with D.C. power supply unit 17 via conductor 37. Article 19, therefore, serves as the positive electrode of an electrodeposition cell while the article is passing through bath 13.

It is to be understood that bus bar 33 may be segmented and that certain of the various segments may have no connection with the power supply unit or may be adapted for polarity reversal to provide additional control over the coating process.

Power supply unit 17 is constructed and arranged to provide between the electrodes and through the coating bath a direct current flow of electrical energy that is commensurate with the size of the electrocoating operation contemplated. Design of the power supply unit should take into consideration the surface area of the workpieces that will be in residence within the coating bath at any given time, the workpiece surface area entering the bath per unit time, the deposition properties of the coating formulation, the conductivity of the coating bath, the thickness of the coating to be formed, etc. Ordinarily, such current will be provided by rectification of an alternating current power source by conventional means.

The exemplary acid resins in Examples 1–20 have electrical equivalent weights between about 1000 and about 2500 and acid numbers between about 50 and about 200 and are resins having both carboxylic acid groups and mineral acid groups in their molecular structure. The dissociable acid groups on the coating materials of Examples 21–24 are limited to sulfonic and phosphonic acid groups. The coating materials employed in Examples 25–31 are polycarboxylic acid resins employed in combination with the resins of Examples 1–24.

EXAMPLE 1

An extended coupled glyceride drying oil paint binder is made by reacting in an agitator tank 8467 parts of alkali-refined linseed oil and 1235 parts of maleic anhydride (heated together at about 232.2° C. for about 3 hours until an acid number of 80–90 results), then cooling this intermediate to 157.2° C., adding 920 parts styrene sulfonic acid and 1200 parts of vinyl toluene containing 48 parts of ditertiary butyl peroxide and reacting at about 219.3° C. for about an hour. The resulting polycarboxylic-polysulfonic acid resin, herein referred to as Resin A, is then cooled to 157.2° C. and 5294 parts of non-heat reactive, thermoplastic, oil-soluble phenolic resin is added, the temperature raised to about 232.2° C. and held 1 hour. The phenolic resin is a solid lump having softening point of 120°–140° C., specific gravity of 1.03–1.05 at 20° C., and has been stripped to get out excess phenol and low molecular weight materials. It is a condensation product of about equimolar quantities of para tertiary butyl phenol and formaldehyde. The resulting acid resin is herein referred to as Resin B.

The material then is cooled to 93.3° C., and 1140 parts are taken for forming a coating dispersion. To these 1140 parts, 100 parts of water are added, then 13.6 parts of triethylamine, the mixture agitated for a few minutes, then 74 more parts of water and 92.5 parts diisopropanol amine added. This mixture is further reduced with 1825 parts water and 32.5 parts diethylene triamine while agitation is continued. A portion of the dispersion is diluted with water to 5% resin solids content for forming an electrocoating bath.

The coating operation is conducted in a metal tank equipped with an agitator. The tank is wired as a cathode and a phosphate-treated thin sheet steel panel 22.85 cm. wide by 26.64 cm. dipped length is used as an anode for coating. The bath volume is 2500 cc. Direct current is imposed on the tank cathode and an immersed panel anode from an external circuit. The paint bath temperature during the operation is between 35° and 37.8° C., and the coating time of the panel is 53 seconds as it is being immersed, 74 seconds as it is fully immersed, and 53 seconds as it is being withdrawn. The voltage across the bath is run up from 0 to about 100 volts. Before baking, the resulting electrodeposited film on the anode is slightly tacky and tenaciously adhering. The film is then baked for 15–20 minutes at about 176.7° C.

EXAMPLE 2

The procedure of Example 1 is repeated with the single difference that the resin-forming ingredients employed in the preparation of Resin A of Example 1 are on this occasion employed in the following proportions:

Resin A-1

| | Parts |
|---|---|
| Linseed oil | 8467 |
| Maleic anhydride | 1015 |
| Vinyl toluene | 600 |
| Styrene sulfonic acid | 1800 |

The extended resin of this example is herein designated Resin B-1. The coated anode before and after curing is similar to that of Example 1.

EXAMPLE 3

The procedure of Example 1 is repeated with the single difference that the resin-forming ingredients employed in the preparation of Resin A of Example 1 are on this occasion employed in the following proportions:

Resin A-2

| | Parts |
|---|---|
| Linseed oil | 8467 |
| Maleic anhydride | 1435 |
| Vinyl toluene | 1200 |
| Styrene phosphonic acid | 880 |

The extended resin of this example is herein designated Resin B-2. The coated anode before and after curing is similar to that of Example 1.

EXAMPLE 4

The procedure of Example 1 is repeated with the single difference that the resin-forming ingredients employed in the preparation of Resin A of Example 1 are on this occasion employed in the following proportions:

Resin A-3

| | Parts |
|---|---|
| Linseed oil | 8467 |
| Maleic anhydride | 1015 |
| Vinyl toluene | 600 |
| Styrene phosphonic acid | 1760 |

The extended resin of this example is herein designated Resin B-3. The coated anode before and after curing is similar to that of Example 3.

EXAMPLE 5

An acrylic resin, Resin C, is made by slowly adding a mixture of 60 parts of butyl acrylate, 18 parts of styrene, 12 parts of methacrylic acid, 7 parts of styrene sulfonic acid, 1 part of t-butyl perbenzoate, and 1 part of benzoyl peroxide into 34.7 parts of 2-butoxy-ethanol maintained at 157.2°–160° C. during a 2½ hour period and is held for an additional hour at this temperature using an agitated reactor equipped with a reflux condenser. The resulting resin is cooled to 137.8° C. and further reacted for one-half hour at 154.4° C. with 10 parts of tris hydroxyl methyl amino methane. The resulting resin dispersion has 75.6 resin solids content and is apparently soluble in the painting bath hereinafter described.

A white paint concentrate is made up by blending 133 parts of the foregoing resin dispersion, 10 parts of a water soluble amino compound mixture (composed of 86 parts diisopropanol amine, 25 parts diethylene triamine, and 86 parts water), 30 parts of a pigment grind (composed of 16 parts of titanium dioxide, 8 parts of fine kaolin clay, 47 parts of water, and 6 parts of an alkyd resin grinding aid, i.e. the reaction product made by heating 948 parts of tall oil fatty acids (having acid number of 197, saponification number of 198, and iodine value of 128) with 155 parts of maleic anhydride at 232.2° C. for 1 hour, cooling the mixture to 104.4° C., adding 503 parts of technical grade pentaerythritol, 394 parts of phthalic anhydride, and 30 parts of xylol, then refluxing the batch at 171.1° C. with separation of water of reaction until an acid number of 102.6 is reached on the resulting resin, and stripping off xylyl.

The bath for electrocoating is prepared by stirring the white paint concentrate with 10 additional parts of the amino compound mixture (86 parts diisopropyl amine, 25 parts diethylene triamine, and 86 parts water) and 780 additional parts of water to make up an agitated liter bath having 12.8% resin solids.

The anode used is a 10.16 cm. wide x 8.89 cm. dipped length thin sheet steel panel and the painting operation is conducted similar to that of Example 1. Bath temperature used is 26.7°–35° C., the voltage run up from 0 to 100 volts. Oven drying of the coated panel for 15 minutes at 176.7° C. cures the film of electrodeposited resin.

As pH of the bath will rise with the coating of successive like panels, the painting operation can be continued on a succession of the panels with incremental addition of makeup acrylic paint concentrate to reduce bath pH and maintain it between about 7 and 8.4, while also maintaining a desirable resin solids concentration in the bath. The makeup paint concentrate is compounded like the paint concentrate described before in this example, except that 20.8 parts of titanium dioxide and 10.4 parts of kaolin clay are used instead of 16 and 8 parts, respectively. This is to maintain resin-to-pigment weight ratio in the bath substantially constant and allow for the fact that the resin-to-pigment ratio in the deposited film is lower than the resin-to-pigment ratio in the bath.

EXAMPLE 6

The procedure of Example 5 is repeated with the single difference that the resin-forming ingredients employed in the preparation of the acid resin of Example 5 are on this occasion employed in the following proportions:

Resin C-1

| | Parts |
|---|---|
| Butyl acrylate | 60 |
| Styrene | 15 |
| Methacrylic acid [1] | 8 |
| Styrene sulfonic acid | 10 |

[1] Typical α,β monounsaturated, monocarboxylic acid.

The coated anode before and after curing is similar to that of Example 5.

EXAMPLE 7

The procedure of Example 5 is repeated with the single difference that the resin-forming ingredients employed in the preparation of the acid resin of Example 5 are on this occasion employed in the following proportions:

Resin D

| | Parts |
|---|---|
| Butyl acrylate | 60 |
| Styrene | 18 |
| Methacrylic acid | 8 |
| Styrene phosphonic acid | 6 |

The coated anode before and after curing is similar to that of Example 5.

EXAMPLE 8

The procedure of Example 5 is repeated with the single difference that the resin-forming ingredients employed in the preparation of the acid resin of Example 5 are on this occasion employed in the following proportions:

Resin D-1

| | Parts |
|---|---|
| Butyl acrylate | 60 |
| Styrene | 15 |
| Methacrylic acid | 7 |
| Styrene phosphonic acid | 10 |

The coated anode before and after curing is similar to that of Example 5.

EXAMPLE 9

An extended coupled glyceride drying oil paint binder is made by reacting in an agitator tank 8467 parts of alkali-refined linseed oil and 1435 parts of maleic anhydride (heated together at about 232° C. for about 3 hours until an acid number of 80–90 results), then cooling this intermediate to 157.2° C., adding 1720 parts of vinyl acetate containing 48 parts of ditertiary butyl peroxide and reacting at 218.3° C. for about an hour. The resulting resin, Resin E, is then cooled and mixed with dilute sulfuric acid, i.e. 10–50 wt. percent $H_2SO_4$ and heated at 125°–150° C. for 1 to 2 hours. The resulting resin is separated, washed in water and dried. The resulting resin, Resin F, is heated to 100° C. with 2500 parts chlorosulfonic acid for about 1 hour, then just neutralized with 20% aqueous NaOH. The resulting resin, Resin G, is washed with water and dried, then admixed at 155° C. with 5294 parts of non-heat reactive, thermoplastic, oil-soluble phenolic resin, the temperature raised at 230° C., and the mixture held 1 hour. The phenolic resin is the same phenolic resin used in Example 1. The resulting extended acid resin, Resin G, is used to prepare a coating dispersion in the manner shown for Example 1.

An aqueous coating bath is prepared from this coating dispersion in the manner shown for Example 1. The electrically induced deposition of this resin upon a steel workpiece is carried out as in Example 1. In continued operation of this bath a minor portion of the amine content is replaced with ammonium hydroxide.

EXAMPLE 10

An extended coupled glyceride drying oil paint binder is made by admixing Resin E of Example 9 with a hydrolyzing amount of dilute NaOH and heating the same at a reflux temperature for 1 to 2 hours. The resinous material is separated, washed, dried and admixed with a 10% molar excess of $POCl_3$ ($PCl_5$ may also be used) based upon the vinyl acetate-derived component of the resin and heated to about 100° C. for 1 to 2 hours. The resulting resin, Resin H, is neutralized with aqueous 20% sodium hydroxide, dried and admixed at 155° C. with 5294 parts of non-heat, reactive, thermoplastic, oil-soluble phenolic resin, the temperature raised to 230° C., and the mixture held 1 hour. The phenolic resin is the same phenolic resin used in Example 1. The resulting extended phosphoric acid resin, Resin I, is used to prepare aqueous paint bath as in Example 1 and electrically induced deposition of this resin is effected upon metal workpieces as in Example 1.

EXAMPLE 11

A paint binder is prepared in the following manner:

A copolymer of vinyl acetate and acrylic acid is formed by adding equimolar parts of vinyl acetate (using polyvinyl-acetate) and acrylic acid to an inert solvent, e.g. xylene, heating to reflux temperature and adding a free radical forming catalyst, ditertiary butyl peroxide, in small increments over a period of 5 hours. In separate preparations, the total catalyst addition is about 0.1, 1.0 and about 2 wt. percent of the polymerizable monomers respectively. The reaction is carried out under an inert gas blanket, i.e. nitrogen.

The copolymer is separated from the solvent, treated with sulfuric acid, washed, dried and subsequently treated with chlorosulfonic acid as in Example 9, then further washed with water and dried. The resulting resin, Resin J, is dispersed in an aqueous coating bath and anodically deposited upon metal workpieces as in Example 1.

EXAMPLE 12

The procedure of Example 11 is repeated with the exception that methacrylic acid is substituted for acrylic acid, Resin K.

EXAMPLE 13

A paint binder is prepared in the following manner:

The copolymer of vinyl acetate and acrylic acid of Example 11 is partially hydrolyzed with sodium hydroxide and treated with $POCl_3$ as in Example 10.

The resulting resin, Resin L, is dispersed in a coating bath as in Example 1 and anodically deposited upon metal workpieces as in Example 1.

EXAMPLE 14

The procedure of Example 13 is repeated except for the difference that $PCl_3$ is substituted for $POCl_3$ to yield a phosphonic acid resin, Resin M.

EXAMPLE 15

A paint binder is prepared in the following manner:

A resin is prepared in the manner of forming the copolymer of Example 11 from the following monomers:

| | Mole percent |
|---|---|
| Vinyl acetate | 10 |
| Acrylic acid | 20 |
| Styrene | 30 |
| 2-ethyl hexyl acrylate | 40 |

The resulting resin, Resin N, is treated with sulfuric acid and chlorosulfonic acid as in Example 9, and the resulting resin, Resin O, is washed, dried and dispered in a coating bath as in Example 1, and anodically deposited upon metal workpieces as in Example 1.

EXAMPLE 16

The procedure of Example 15 is repeated except for the difference that the methyl ester of acrylic acid is used in lieu of 2-ethyl hexyl acrylate, Resin O–1.

EXAMPLE 17

The procedure of Example 15 is repeated except for the difference that butyl methacrylate is used in lieu of 2-ethyl hexyl acrylate, Resin O–2.

EXAMPLE 18

The procedure of Example 15 is repeated except that Resin N is treated with $SOCl_2$ instead of chlorosulfonic acid to yield Resin P.

EXAMPLE 19

A paint binder is prepared in the following manner:

Resin N of Example 15 is partially hydrolyzed with sodium hydroxide, washed, dried, treated with $POCl_3$, treated with sodium hydroxide, washed and dried as in Example 10. The resulting resin, Resin Q, is dispersed in a coating bath as in Example 1 and anodically deposited upon metal workpieces as in Example 1.

EXAMPLE 20

The procedure of Example 19 is repeated except for the difference that $PCl_3$ is used instead of $POCl_3$. This resin is herein designated Resin R.

EXAMPLE 21

Polystyrene sulfonic acid, a brown solid having electrical equivalent weight of about 209, a degree of monosulfonation of the aromatic nuclei of 0.806 and herein designated Resin S, is dissolved in water to give a 5% resin solution. Exclusive of the sulfonic acid groups the polymer has average molecular weight of about 11,000.

The solution is transferred into an electrodeposition bath tank and a mild steel sheet anode is dipped into the resulting bath. Direct current is applied across the bath and the voltage raised to a maximum of 30. The resulting anode, coated with a thin film of polystyrene sulfonic acid, is removed from the bath and the coating set by dipping the anode into an aqueous aluminum sulfate solution, then drying. Alternatively, the setting can be accomplished by spraying with ethylene glycol and baking at 180° C. for 15 minutes.

EXAMPLE 22

Butadiene-styrene sulfonic acid, herein designated Resin T, is dispered mechanically in water to give a 3% resin suspension. The pH of the mixture is brought to 5 by addition of diisopropanol amine. The ratio of 1,3 butadiene to styrene and sulfonated styrene units in the polymer is 50/50. Exclusive of sulfonic acid groups, the polymer has molecular weight of about 100,000. The electrical equivalent weight is about 400, and the degree of monosulfonation of the styrene units present is about 0.50.

This dispersion is used as the bath for electrodeposition. Voltage is run to a maximum of about 50, whereby the steel panel anode obtains a deposit of resin. The resin deposit can be set by dipping the coated panel in an aqueous solution of diethylene triamine and baking at 175° C. for 15 minutes. Alternatively, the setting can be done by spraying on a trace of tertiary butyl peracetate in a volatile solvent, drying, spraying on a small amount of divinyl benzene, then warming to about 90° C.

EXAMPLE 23

A styrene polymer, herein designated Resin U, having about 50% of its aromatic nuclei substituted with methylene phosphonic acid groups and having an electrical equivalent weight of about 300, is dispersed in water with stirring. The dispersion is brought to pH 6 with diisopropanol amine. Exclusive of phosphonic acid groups the polymer has average molecular weight of about 20,000.

In a 3-minute electrodeposition time the voltage across the bath is run to a maximum of 75 volts whereby a film of the phosphonic acid resin forms on a steel panel anode. The anode is removed and sprayed with dipentene dioxide, then baked for 15 minutes at 180° to set the resin.

EXAMPLE 24

An aqueous dispersion of polyvinyl acetate homopolymer solids, 56% non-volatile solids of 1 micron mean particle size, said dispersion having viscosity in the range of 900–1200 centipoises, pH of 4–6, and density of 9.25 lbs. per gallon, is reduced with additional water to 5% solids. Average molecular weight of the homopolymer is in excess of 100,000. Polystyrene sulfonic acid, Resin S of Example 21, is dissolved in the aqueous phase of the homopolymer dispersion to bring the resin content of the dispersion as a whole up to 5% and the dispersion is subjected to the electrodeposition conditions of Example 23.

EXAMPLE 25

An extended coupled glyceride drying oil paint binder is made by reacting in an agitator tank 8467 parts of alkali-refined linseed oil and 2025 parts of maleic anhydride (heated together at about 232.2° C. for about 3 hours until an acid number of 80–90 results), then cooling this intermediate to 157.2° C., adding 1789 parts of vinyl toluene containing 48 parts of ditertiary butyl peroxide and reacting at about 219.3° C. for about an hour. The resulting polycarboxylic acid resin, hereinafter referred to as Resin V, is then cooled to about 157.2° C. and 5294 parts of the phenol-formaldehyde resin of Example 1 are added, the temperature raised to about 232.2° C. and held 1 hour. The resulting acid resin is herein referred to as Resin W.

Separate resin blends are prepared by physically blending Resin V with each of the resins employed in the previous examples having mineral acid dissociable groups in their molecular structure, i.e. Resins A through A–4, B through B–4, C and C–1, D and D–1, F through M, O through O–2, and P through U. The blend is effected with conventional blending means employing Resin V and the mineral acid resin in amounts such that in each blend the dissociable mineral acid groups comprise about 0.5% of the total dissociable acid groups in the resin blend. Following the procedure of Example 1, a concentrate is formed by agitating each blend with water, triethylamine, diisopropanol amine, and diethylene triamine; the concentrate is diluted with water to 5% resin solids content to form an electrocoating bath; and electrodeposition of the dispersed resin blend upon steel panels is carried out as in the preceding examples. In separate applications with each blend this procedure is repeated at a pH of 5, a pH of 7.5 and a pH of 9.5 respectively.

EXAMPLE 26

The procedure of Example 25 is repeated with the single modification being that each of the separate blends are formed employing Resin V and the mineral acid resin in respective amounts such that the dissociable mineral acid groups comprise about 5% of the total dissociable acid groups in the resin blend.

EXAMPLE 27

The procedure of Example 25 is repeated with the single modification being that each of the separate blends are formed employing Resin V and the mineral acid resin in respective amounts such that the dissociable mineral acid groups comprise about 10% of the total dissociable acid groups in the resin blend.

EXAMPLE 28

The procedures of Examples 25, 26 and 27 are repeated with the single modification being that Resin W is substituted for Resin V.

EXAMPLE 29

A continuous electrocoating operation of the type set forth hereinbefore in connection with the description of the accompanying drawing is carried out in the following manner: three separate aqueous concentrates of resin, water soluble amine and water are formed in the manner of Example 1 using the sulfonic acid resin B, the phosphonic acid resin B–2 and the polycarboxylic acid resin W. The separate concentrates are dispersed in water to provide an electrocoating bath having a 5% resin solids content in proportions such that the dissociable phosphonic acid groups comprise about 5% of the total acid groups on the resins dispersed in the bath and the dissociable sulfonic acid groups comprise about 2% of said total; a difference of potential of about 100 volts is employed between the cathode, the bath retaining tank and the anode-workpiece, and the concentration of each of the respective resins in the bath is maintained by replacement of the separate and different concentrates in proportion to the rate of their respective depositions upon the metal workpieces passed through the bath.

EXAMPLE 30

The procedure of Example 29 is repeated with the single modification that the relative concentrations of the sulfonic acid resin and the phosphonic acid resin in the electrodeposition bath are reversed.

EXAMPLE 31

The procedure of Example 29 is repeated with the following modifications: the sulfonic acid acrylic resin, B, the phosphonic acid acrylic resin, Resin D–1, is substituted for the phosphonic acid resin, Resin B–2, and the polycarboxylic acid resin, Resin V, is substituted for the polycarboxylic acid resin, Resin W. By way of further modification of Example 29, the resins are employed in proportions such that the dissociated sulfonic acid groups and the dissociable phosphonic acid groups each separately comprise about 5% of the total number of dissociable acid groups on the resins in the electrocoating bath.

As hereinbefore mentioned and illustrated the backbone resin supporting such mineral acid groups is preferably a polycarboxylic acid. Broadly, the polycarboxylic acids useful for this purpose are in and of themselves film-forming at the electrodeposition bath temperature and are curable to a tack-free film. They include: coupled siccative oils, e.g. coupled glyceride drying or semidrying oils such as sunflower, safflower, perilla, hempseed, walnut seed, dehydrated castor oil, rapeseed, tomato seed, menhaden, corn, tung, soya, oiticica, or the like, the olefinic double bonds in the oil being conjugated or nonconjugated or a mixture, the coupling agent being acyclic olefinic acid or anhydride, preferably maleic anhydride, but also crotonic acid, citraconic acid, or anhydride, fumaric acid, or an acyclic olefinic aldehyde or ester of an acyclic olefinic ester such as acrolein, vinyl acetate, methyl maleate, etc., or even a polybasic acid such as phthalic or succinic, particularly coupled glyceride oils that are further reacted with about 2–25% of a polymerizable vinyl monomer; maleinized unsaturated fatty acids; maleinized rosin acids, alkyd resins, e.g. the esterification products of a polyol with a polybasic acid, particularly glyceride drying oil-extended alkyd resins; acidic hydrocarbon drying oil polymers such as those made from maleinized copolymers of butadiene and diisobutylene; diphenolic acid and like polymer resins; and acrylic and vinyl polymers and copolymers having carboxylic acid groups such as butyl acrylate-methyl methacrylate-methacrylic acid copolymers, vinyl acetate-acrylic acid copolymers, acrylic acid and lower alkyl ($C_{1-4}$) substituted acrylic acid-containing polymers, i.e. those having carboxyl groups contributed by alpha,beta unsaturated carboxylic acids or residues of these acids, etc.

The polycarboxylic acid resins which in one embodiment are codispersed with the resins having mineral acid groups may likewise be resins of the types just described. The resin having dissociable mineral acid groups in addition to dissociable carboxylic acid groups may be prepared either by reacting the backbone resin with the appropriate mineral acid, acid anhydride or other acid yielding compounds, or in their formation they may be copolymerized with an unsaturated monomer having the desired acid group in its molecular structure.

To supplement the acid resin or acid resins in the bath as operations continue one can introduce additional binder, resin that is optionally pigmented to act as replacement paint solids, gradually, that is continuously or incrementally. For ease of dispersion and handling it is preferred to add such supplemental resin in the form of a concentrated aqueous dispersion containing, on a pigment and filler-free basis, about 50–95% by weight of acid resin, straight or extended, and about 1–10% of water soluble amino compound based on the weight of acid resin with remainder consisting essentially of water. The bath viscosity should be limited to a value not substantially more than about 200 times that of water and the proportion of said amino compound is preferably not substantially more than that sufficient for maintaining the pH of said bath substantially constant and in the range of about 6 to about 10.

What is claimed is:

1. In a process for anodically depositing coating material from a liquid bath which comprises immersing an electrically conductive object to be coated within said bath, providing electrical connection exterior to said bath between said object and a cathode that is spaced apart from said object and in electrical communication with said bath, dispersing a coating material within said bath, providing a difference of electrical potential between said object and said cathode and transmitting a direct current of electrical energy through said bath between said object and said cathode and electrodepositing said coating material upon said object, the improvement wherein said bath comprises an aqueous dispersion of an acidic organic resin that deposits upon said object substantially directly proportional to said direct current and has in its molecular structure ionizable mineral acid groups selected from the group consisting of sulfonic, phosphonic, sulfate and phosphate groups and mixtures of the same.

2. The process of claim 1 wherein said resin contains phosphonic acid groups.

3. The process of claim 1 wherein said resin contains sulfonic acid groups.

4. The process of claim 1 wherein said resin contains sulfate groups.

5. The process of claim 1 wherein said resin contains phosphate groups.

6. The process of claim 1 wherein said resin is a polycarboxylic acid having ionizable carboxylic acid groups in addition to said mineral acid groups.

7. In a process for anodically depositing coating material from an aqueous bath which comprises immersing an electrically conductive object to be coated within said bath, providing electrical connection exterior to said bath between said object and a cathode that is spaced apart from said object and in electrical communication with said bath, providing a difference of electrical potential between said object and said cathode and transmitting a direct current of electrical energy through said bath between said object and said cathode and electrodepositing dispersed coating material from said bath upon said object, the improvement wherein said bath comprises an aqueous dispersion of a water-ionizable amino compound and a film-forming acidic resin that deposits upon said object substantially directly proportional to said direct current, said resin being dispersed as a plurality of finely divided anionic polyelectrolytes and having in its aqueous dispersed state a plurality of mineral acid radicals selected from the group consisting of sulfonic, phosphonic, sulfuric and phosphoric acid radicals.

8. The process of claim 7 wherein said difference of electrical potential is in the range of about 20 to about 500 volts.

9. The process of claim 7 wherein said acidic resin has an electrical equivalent weight between about 500 and about 20,000 and an acid number between about 30 and about 300.

10. The process of claim 7 wherein said resin is a resin having in its dispersed state in said bath a plurality of ionic sites a minor proportion of which are said mineral acid radicals and a major proportion of which are carboxylic acid radicals.

11. The process of claim 7 wherein the pH of said bath is maintained in the range of about 4 to about 10.

12. The process of claim 7 wherein said bath is maintained at a temperature in the range of about 15° to about 90° C. and pigmentary substance is suspended in said bath.

13. In a process for anodically depositing coating material from an aqueous coating bath which comprises immersing an electrically conductive object to be coated within said bath, providing electrical connection exterior to said bath between said object and a cathode that is spaced apart from said object and in electrical communication with said bath, providing a difference of electrical potential between said object and said cathode and transmitting a direct current of electrical energy through said bath between said object and said cathode and electrodepositing dispersed coating material from said bath upon said object, the improvement wherein said bath comprises an aqueous dispersion of a water-ionizable amino compound and a film-forming acidic organic resin that exhibits anionic polyelectrolyte behavior as indicated by its depositing upon said object substantially directly proportional to said direct current and has in its molecular structure prior to dispersion carboxylic acid groups and mineral acid groups selected from the group consisting of sulfonic, phosphonic, sulfate and phosphate groups and mixtures of the same, said carboxylic acid groups and mineral acid groups being ionizable in the presence of water and amino compound in said aqueous bath.

14. The process of claim 13 wherein said mineral acid groups comprise about 0.5 to about 10% of the total ionizable acid groups on the resins within said bath.

15. The process of claim 13 wherein said resin has an electrical equivalent weight between about 1000 and about 2500 and an acid number between about 50 and about 200.

16. The process of claim 13 wherein said amino compound is a water soluble amine.

17. The process of claim 13 wherein said amino compound is ammonium hydroxide.

18. The process of claim 13 wherein said resin is codispersed with a synthetic polycarboxylic acid resin having an electrical equivalent weight between about 1,000 and 20,000, an acid number between about 30 and about 300, and a plurality of ionizable carboxylic acid groups in its molecular structure, said ionizable carboxylic acid groups being the sole ionizable acid groups on said resin.

19. In a process for anodically depositing coating material from an aqueous coating bath which comprises immersing an electrically conductive object to be coated within said bath, providing electrical connection exterior to said bath between said object and a cathode that is spaced apart from said object and in contact with said bath, providing a difference of electrical potential between said object and said cathode and transmitting a direct current of electrical energy through said bath between said object and said cathode and electrodepositing said coating material upon said object, the improvement wherein said bath comprises an aqueous dispersion of a water-ionizable amine and a finely divided, film-forming, acidic organic resin that exhibits in aqueous dispersion anionic polyelectrolyte behavior as indicated by its depositing upon said object substantially directly proportional to said direct current, has an electrical equivalent weight between about 500 and about 20,000 and has in its molecular structure prior to dispersion carboxylic acid groups and mineral acid groups selected from the group consisting of sulfonic, phosphonic, sulfate and phosphate groups and mixtures of the same, a substantial percentage of said polycarboxylic acid groups and said mineral acid groups dissociating in the presence of said amine and water in said aqueous bath to provide a plurality of ionic sites on said resin.

20. The process of claim 19 wherein said resin comprises a coupled siccative glyceride oil the molecular weight of which is in the range of about 5,000 to about 20,000.

21. The process of claim 19 wherein said resin comprises coupled glyceride drying oil reacted under substantially anhydrous conditions with about 2 to about 25% of a polymerizable vinyl monomer.

22. The process of claim 19 wherein said resin has carboxyl groups contributed by an alpha,beta monounsaturated monocarboxylic acid.

23. The process of claim 19 wherein, as coating operations continue, said resin is depleted from the bath, an amino compound reserve accumulates in the bath, and a supplemental quantity of said resin is added to the bath gradually, said supplemental quantity being sufficient to maintain the pH of said bath in the range of about 6 to about 10.

24. The process of claim 23 wherein the supplemental resin is introduced in the form of a concentrated aqueous dispersion containing, on a pigment and mineral filler-free basis, water, about 50 to 95% by weight of organic binder, at least the predominant fraction of which is acid resin which prior to dispersion contains dissociable acid groups of which about 90 to about 99.5% are carboxylic acid groups and about 0.5 to about 10% are mineral acid groups selected from the group consisting of sulfonic, sulfate, phosphonic and phosphate groups and mixtures of the same, and about 1 to about 10% of water soluble amino compound based on the weight of said binder, the sum of the proportions of said binder and said amino compound being less than 100%.

25. In a process for anodically depositing coating material from an aqueous coating bath which comprises immersing an electrically conductive object to be coated within said bath, providing electrical connection exterior to said bath between said object and a cathode that is spaced apart from said object and in electrical communication with said bath, providing a difference of electrical potential between said object and said cathode and transmitting a direct current of electrical energy through said bath between said object and said cathode and electro-depositing said coating material upon said object, the improvement wherein said bath comprises an aqueous dispersion of a water-ionizable amine and finely divided particles of a film-forming polycarboxylic acid resin at least partially neutralized with a sufficient quantity of said amine to impart to said resin anionic polyelectrolyte behavior in said bath as indicated by its disposition to deposit upon said object at constant voltage substantially directly proportional to said direct current until said current is dissipated by increasing electrical resistance of the resulting deposit to less than about 5% of the current of deposition initiation and having in its molecular structure prior to dispersion dissociable acid groups of which about 90 to about 99.5% are carboxylic acid groups and about 0.5 to about 10% are mineral acid groups selected from the group consisting of sulfonic, phosphonic, sulfate and phosphate groups and mixtures of the same, a substantial portion of both said carboxylic acid groups and said mineral acid groups dissociating in the presence of said amine and the water in said aqueous bath to provide a plurality of ionic sites on said resin while said resin is in its dispersed state.

26. The process of claim 25 wherein said resin particles have a maximum diameter of about 50 microns.

27. The process of claim 26 wherein essentially all of said resin particles have a maximum diameter of below about 500 millimicrons.

28. The process of claim 25 wherein the concentration of said resin is established and maintained in said bath between about 0.5 and about 35% by weight of said bath, simultaneously and correlatively the bath viscosity is limited to a value not substantially more than about 200 times that of water at the same temperature, and the bath temperature is maintained between about 15° C. and about 50° C.

29. The process of claim 28 wherein the concentration of said resin is established and maintained in said bath between about 2 and about 10% by weight of said bath.

30. The process of claim 25 wherein said bath is maintained at a pH in the range of about 6.8 to about 8.7 and said resin has an electrical equivalent weight between about 1,000 to about 2,500 and is further characterized in that it will electrodeposit upon said object at constant voltage substantially directly proportional to said direct current until said current is dissipated by increasing electrical resistance of the resulting deposit to less than about 1% of the current of deposition initiation.

31. In a process for anodically depositing coating material from an aqueous bath which comprises immersing an electrically conductive object to be coated within said bath, providing electrical connection exterior to said bath between said object and a cathode that is spaced apart from said object and in contact with said bath, providing a difference of electrical potential between said object and said cathode and transmitting a direct current of electrical energy through said bath between said object and said cathode and electrodepositing dispersed coating material from said bath upon said object, the improvement wherein said bath comprises an aqueous dispersion of a water soluble amino compound, a first, finely divided, film-forming, acidic, organic resin that exhibits in aqueous dispersion anionic polyelectrolyte behavior as indicated by its depositing upon said object substantially directly proportional to said direct current, has an electrical equivalent weight between about 500 and about 20,000, and a second, finely divided, film-forming acidic, organic resin, said first resin and said second resin each having in its molecular structure prior to dispersion dissociable mineral acid groups selected from the group consisting of sulfonic, phosphonic, sulfate and phosphate groups and mixtures of the same, a substantial percentage of said mineral acid groups dissociating in the presence of the aqueous dispersion of said amino compound in said bath to provide a plurality of ionic sites on said first resin and on said second resin.

32. In a process for anodically depositing coating material from an aqueous bath which comprises immersing an electrically conductive object to be coated within said bath, providing electrical connection exterior to said bath between said object and a cathode that is spaced apart from said object and in electrical communication with said bath, dispersing a coating material within said bath, providing a difference of electrical potential between said object and said cathode in the range of about 20 to about 500 volts and transmitting a direct current of electrical energy through said bath between said object and said cathode and electrodepositing dispersed coating material from said bath upon said object, the improvement wherein said bath comprises an aqueous dispersion of a water soluble amino compound, a finely divided, film-forming acidic organic resin and a finely divided, film-forming polycarboxylic acid resin, each of said resins exhibiting in aqueous dispersion of said amino compound anionic polyelectrolyte behavior indicated by its depositing upon said object substantially directly proportional to said direct current and having an electrical equivalent weight between about 500 and about 20,000, said acidic organic resin having in its molecular structure prior to dispersion mineral acid groups selected from the group consisting of sulfonic, phosphonic, sulfate and phosphate groups and mixtures of the same, a substantial percentage of which are dissociated in aqueous dispersion with said amino compound to provide a plurality of ionic sites on said acidic organic resin, said polycarboxylic acid resin having a plurality of carboxylic acid groups within its molecular structure a substantial percentage of which dissociate in aqueous dispersion with said amino compound providing a plurality of ionic sites on said polycarboxylic acid resin, dissociable carboxylic acid groups constituting about 90 to about 99.5% of the total dissociable acid groups on said resins and dissociable mineral acid groups constituting about 0.5 to about 10% of said total.

33. The process of claim 32 wherein said acidic organic resin contains dissociable carboxylic acid groups in addition to said mineral acid groups.

34. In a process for anodically depositing coating material from an aqueous bath which comprises immersing an electrically conductive object to be coated within said bath, providing electrical connection exterior to said bath between said object and a cathode that is spaced apart from said object and in electrical communication with said bath, dispersing a coating material within said bath, providing a difference of electrical potential between said object and said cathode in the range of about 20 to about 500 volts and transmitting a direct current of electrical energy through said bath between said object and said cathode and electrodepositing dispersed coating material from said bath upon said object, the improvement wherein said bath comprises an aqueous dispersion of a water soluble amino compound, a first, finely divided, film-forming, acidic, organic resin, a second, finely divided, film-forming, acidic, organic resin, and a finely divided, film-forming, polycarboxylic acid resin, each of said resins exhibiting in aqueous dispersion of said amino compound anionic polyelectrolyte behavior indicated by its depositing upon said object substantially directly proportional to said direct current and having an electrical equivalent weight between about 500 and about 20,000, said first resin and said second resin each having in its molecular structure prior to dispersion mineral acid groups selected from the group consisting of sulfonic, phosphonic, sulfate and phosphate groups and mixtures of the same, a substantial percentage of which are dissociated in aqueous dispersion with said amino compound to provide a plurality of ionic sites on each of said resins, the acid groups of said polycarboxylic acid resin consisting of carboxylic acid groups, a substantial percentage of which are dissociated in aqueous dispersion with said amino compound, dissociable carboxylic acid groups constituting about 90 to about 99.5% of the total dissociable acid groups on said resins and dissociable mineral acid groups constituting about 0.5 to about 10% of said total.

35. The process of claim 34 wherein the mineral acid groups of said first resin are sulfur-containing acid groups, the mineral acid groups of said second acid resin are phosphorous-containing acid groups, and said bath contains more of said sulfur-containing acid groups than said phosphorous-containing acid groups.

36. The process of claim 35 wherein the mineral acid groups of said first resin are sulfur-containing acid groups, the mineral acid groups of said second resin are phosphorous-containing acid groups and said bath contains more of said phosphorous-containing groups than said sulfur-containing acid groups.

37. The process of claim 34 wherein the mineral acid groups of said first resin are sulfonic acid groups and the mineral acid groups of said second resin are phosphonic acid groups.

38. The process of claim 34 wherein said resins are depleted from said bath in continued operation of the coating process and are replaced in direct proportion to the rate of their individual depletions.

39. An improved film-forming aqueous paint binder replenishment concentrate composition adapted for dispersing in an aqueous electrocoating bath containing sufficient water soluble amino compound to impart anionic polyelectrolyte behavior in said bath to resin in said concentrate composition, said binder concentrate composition comprising, on a pigment and mineral filler-free basis: water, about 50 to about 95% by weight of organic binder, at least a predominant fraction of which is acid resin having an electrical equivalent weight between about 500 and about 20,000 and which prior to dispersion contains dissociable acid groups selected from the group consisting of sulfonic, sulfate, phosphonic, and phosphate groups and mixtures of the same, and about 1 to about 10% of water soluble amino compound based on the weight of said binder, the sum of the proportions of said binder and said amino compound being less than 100%.

40. An improved film-forming aqueous paint binder replenishment concentrate composition adapted for dispersing in an aqueous electrocoating bath containing sufficient water soluble amino compound to impart anionic polyelectrolyte behavior in said bath to resin in said concentrate composition, said binder concentrate composition comprising, on a pigment and mineral filler-free basis: water, about 50 to about 95% by weight of organic binder, at least a predominant fraction of which is acid resin which prior to dispersion contains dissociable acid groups of which a major proportion are carboxylic acid groups and a minor proportion are mineral acid groups selected from the group consisting of sulfonic, sulfate, phosphonic, and phosphate groups and mixtures of the same, and about 1 to about 10% of water soluble amino compound based on the weight of said binder, the sum of the proportions of said binder and said amino compound being less than 100%.

41. An improved film-forming organic resin paint aqueous binder replenishment concentrate composition adapted for dispersing in an aqueous electrocoating bath containing sufficient water soluble amino compound to impart anionic polyelectrolyte behavior in said bath to resin in said binder concentrate composition, said binder concentrate composition comprising, on a pigment and mineral filler-free basis: water, about 50 to about 95% by weight of organic binder, at least a predominant fraction of which is acid resin which prior to dispersion contains dissociable acid groups of which about 90 to about 99.5% are carboxylic acid groups and about 0.5 to about 10% are mineral acid groups selected from the group consisting of sulfonic, sulfate, phosphonic, and phosphate groups and mixtures of the same, and about 1 to about 10% of water soluble amino compound based on the weight of said binder, the sum of the proportions of said binder and said amino compound being less than 100%.

42. The composition of claim 41 wherein said mineral acid groups include both sulfur-containing groups and phosphorous-containing groups.

43. The composition of claim 41 wherein said mineral acid groups are sulfur-containing groups.

44. The composition of claim 41 wherein said mineral acid groups are phosphorous-containing groups.

45. An aqueous electrocoating bath adapted for use in anodic deposition of an acid resin upon a conductor comprising water, about 0.5 to about 35% by weight of organic binder, on a pigment and mineral-free basis, at least a predominant fraction of which is acid resin which prior to dispersion contains dissociable acid groups of which about 90 to about 99.5% are carboxylic acid groups and about 0.5 to about 10% are mineral acid groups selected from the group consisting of sulfonic, sulfate, phosphonic, and phosphate groups and mixtures of the same, and about 1 to about 10% of water soluble amino compound based on the weight of said binder, the sum of the proportions of said binder and said amino compound being less than 100%, the proportion of said amino compound being not substantially more than sufficient for maintaining the pH of said bath essentially constant and in the range of about 6 to about 10.

46. The electrocoating bath of claim 45 wherein there is dispersed an acid resin which comprises coupled glyceride drying oil reacted with about 2 to about 25% of a polymerizable vinyl monomer.

47. The electrocoating bath of claim 45 wherein there is dispersed an acid resin which has carboxyl groups contributed by an alpha, beta monounsaturated monocarboxylic acid.

48. The electrocoating bath of claim 45 wherein at least a predominant fraction of said binder is an acid resin having an electrical equivalent weight between about 500 and about 20,000.

References Cited

UNITED STATES PATENTS

| | | | |
|---|---|---|---|
| 2,206,090 | 7/1940 | Haggenmacher | 204—181 |
| 2,530,366 | 11/1950 | Gray | 204—181 |
| 3,297,557 | 1/1967 | Huggard | 204—181 |

FOREIGN PATENTS

| | | |
|---|---|---|
| 650,753 | 3/1951 | Great Britain. |

JOHN H. MACK, *Primary Examiner.*

E. ZAGARELLA, *Assistant Examiner.*